(No Model.)

W. E. LAIRD.
DEVICE FOR TRANSMITTING MOTION.

No. 299,231. Patented May 27, 1884.

WITNESSES:
C. Neveux
C. Sedgwick

INVENTOR:
W. E. Laird
BY Munn & Co
ATTORNEYS.

UNITED STATES PATENT OFFICE.

WESLEY E. LAIRD, OF EAST CALAIS, VERMONT.

DEVICE FOR TRANSMITTING MOTION.

SPECIFICATION forming part of Letters Patent No. 299,231, dated May 27, 1884.

Application filed April 4, 1884. (No model.)

*To all whom it may concern:*

Be it known that I, WESLEY E. LAIRD, of East Calais, in the county of Washington and State of Vermont, have invented a new and useful Improvement in Devices for Transmitting Motion, of which the following is a full, clear, and exact description.

The invention relates to means for transmitting motion from one pulley to another, and so that the driving-pulley, moving at a uniform or given speed, may be made to operate the driven pulley at a variable speed without stopping the motion of the driver or driven pulley. It is applicable to all kinds of machines which, or parts of which, are required to be run at a certain speed or different speeds without regard to the speed of the motor, and may be used either as a primary means of transmitting motion or as an intermediate means. It will be found very useful for transmitting motion on sawing-machines for sawing up logs into boards, on lathes in which stepped cone-pulleys are used, and in various other machines, no stoppage being necessary, as in shifting the belt from one pulley to another when required to change the speed. Of course the construction and arrangement of parts, or certain of them, will vary with the particular machine or purpose to which the invention is designed to be applied; but the principle of the invention will remain the same in all.

The invention consists in a combination of two reversely-tapering cone-pulleys arranged upon arbors or shafts parallel with one another, at a distance apart to bring the surfaces of the pulleys in juxtaposition, but not in contact, with one another, and an endless belt applied to one of the pulleys, of somewhat greater length than is necessary to encircle the largest portion of the diameter of said pulley, and of a thickness so that it will be gripped firmly by the pulleys at its passage between them. With said belt is combined a shifter or carrier that, accordingly as it is moved toward the larger or smaller ends of the pulley carrying the belt, will shift the belt to quicken or reduce the speed of the one pulley relatively to the other, the one pulley driving the other in an opposite direction by frictional contact of the belt between the pulleys. Means are also provided for increasing or diminishing the grip of the pulleys on the belt and for arresting the motion of the driven pulley without affecting that of the driver.

Reference is to be had to the accompanying drawings, forming a part of this specification, in which similar letters of reference indicate corresponding parts in both the figures.

Figure 1:
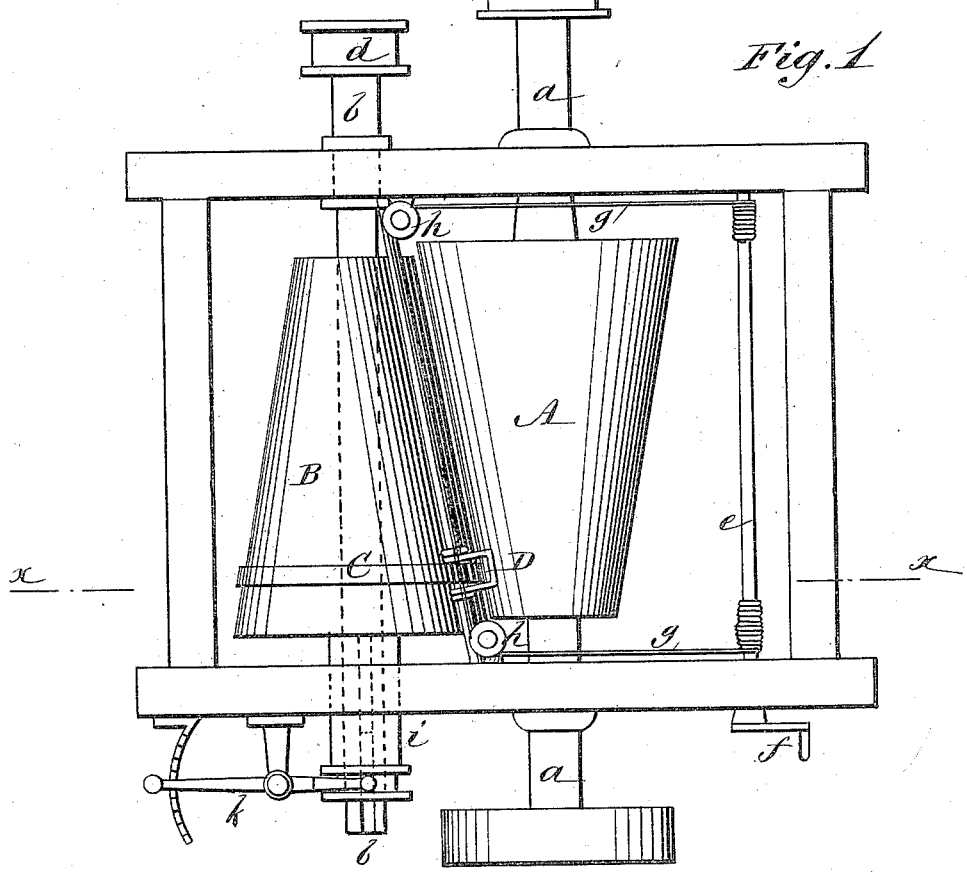
Figure 2:
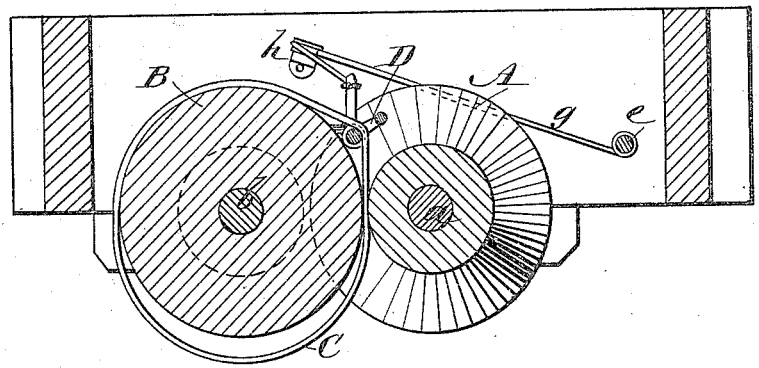

Figure 1 represents a plan view of my improved means for transmitting motion, and with attached pulleys suitably arranged for communicating motion to the saw-arbor of a sawing-machine and to the carriage which feeds up the lumber. Fig. 2 is a vertical section of the same on the line $x\ x$ in Fig. 1.

A indicates the driving conical pulley, and B the driven conical one, arranged upon arbors or shafts $a\ b$, which are parallel with one another and at such a distance apart that the two pulleys, each of which has its smaller end opposite the larger end of the other one, have their tapering surfaces free from contact with one another, but sufficiently close to grip between them a narrow endless belt, C, arranged around one, here shown as the driven pulley B. This belt or band should be sufficiently long to slightly more than encircle the larger end of the pulley around which it is arranged. From this description it will be seen that the driving-pulley A will operate the driven pulley B in a reverse direction by the pressure of the pulleys on the belt between them, and that accordingly as said belt is moved toward the smaller or larger ends of the pulley B will said pulley have its velocity increased or diminished, while the motion of the driving-pulley A will be uniform, and only when the belt is in a central position intermediately of the length of the pulleys A B will the speed of both pulleys be the same—that is, supposing said reversely-tapering pulleys to be of like sizes. If the arrangement be applied to a sawing-machine for sawing up logs or lumber into boards, then a pulley, $c$, on the shaft $a$ of the driver may communicate the necessary motion from the saw-arbor, while a pulley, $d$, of the shaft $b$ of the pulley B may be used to actuate the operating-arbor of the feeding devices; and by the variation in speed which may be given to the pulley B by the shifting of the belt C, as described, the carriage conveying the log may be moved up fast or slow, according to the size and quality of the log. This may be done without stopping the motion of the machine or any part of it, and may be done expeditiously and graduated as desired by the operator manipulating a suitable belt-shifter to move the belt C, as required. Such may be done by means of a simple lever; but the devices here shown for the purpose consist of a windlass-shaft, e, a crank or handle, f, on said shaft, and a cord or rope, g, suitably connected to the shaft e, and, after passing round pulleys h h to the belt shifter or carrier D, so that, according to the direction in which the shaft e is turned will the belt be moved toward the large or small end of the pulley B, to vary its speed as required. Furthermore, the pulley B may be fitted to slide endwise on its shaft b while rotating with it—as, for instance, by a sleeve, i, and feather fitting a longitudinal groove in the shaft, and a lever, k, for controlling said sliding movement, or by any other suitable means. This endwise adjustment of the pulley B increases or diminishes the distance apart of the two pulleys A B, so as to increase or diminish the grip of said pulleys on the belt C, or to arrest the motion of the driven pulley B, by providing for slip, and which may occasionally be found useful—as, for instance, supposing the invention to be applied to a sawing-frame, when running the log-carriage back.

Having thus described my invention, I claim as new and desire to secure by Letters Patent—

1. The combination of the reversely conical or tapering pulleys A B, fitted on shafts parallel with one another, arranged at such a distance apart as to bring the surfaces of said pulleys in close proximity to but free from contact with each other, and an endless belt or band, C, arranged to freely receive the one pulley through it, and capable of adjustment thereon or along, and of being gripped by the two pulleys between which it passes, substantially as and for the purposes specified.

2. The combination of the belt shifter or carrier D and means for operating the same with the reversely-conical pulleys A B and the endless belt or band C, arranged to freely receive through it the one pulley and to pass between both pulleys, essentially as shown and described.

3. In a device for transmitting motion from one conical or tapering pulley to another by pressure of said pulleys upon a belt or band arranged to pass in between them, as described, the one of said pulleys made adjustable in direction of its length, and means for so adjusting the same, whereby the grip of the pulleys on the band may be increased or diminished, or the driven pulley may have its motion arrested without affecting the movement of the driver, substantially as specified.

WESLEY E. LAIRD.

Witnesses:
BENJ. P. WHITE,
A. D. PEARCE.